Jan. 28, 1969     U. HAPPE     3,424,371
SYNTHESIS GAS PLANT
Filed April 20, 1967
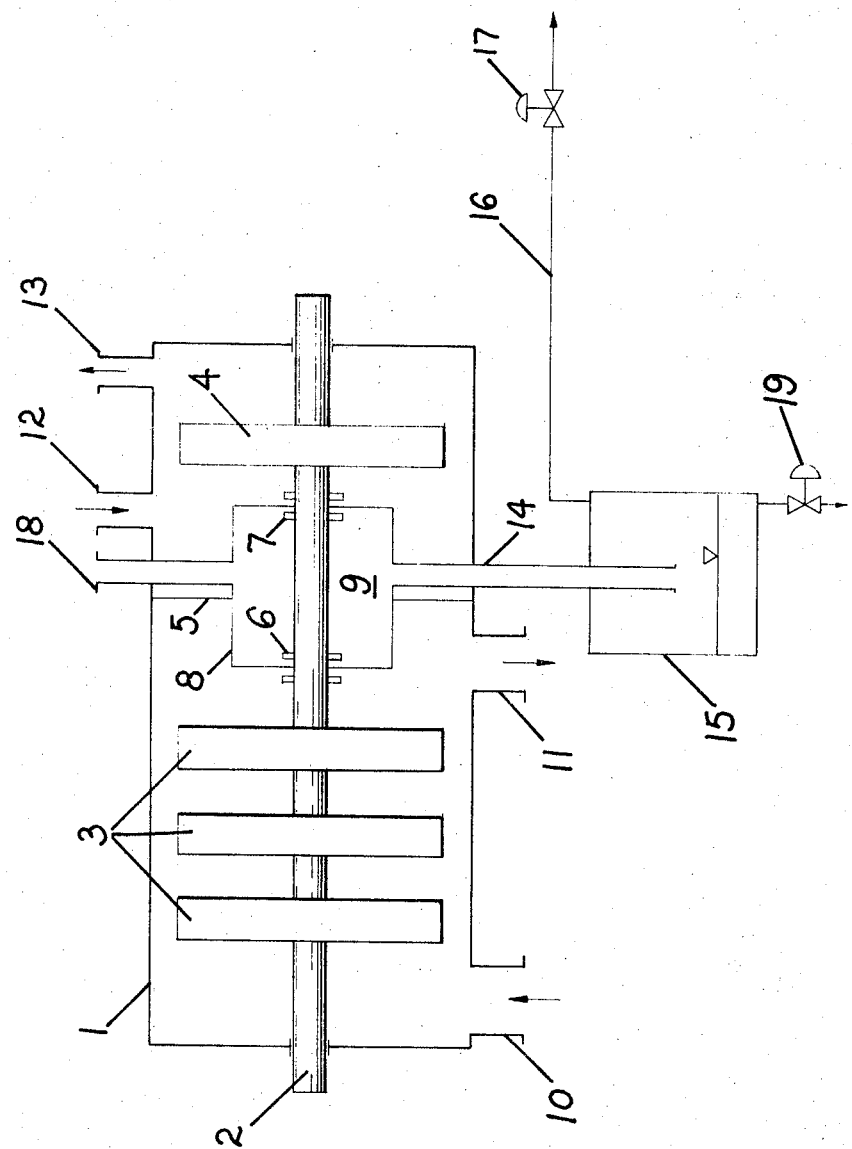
INVENTOR.
Ulrich Happe
BY
Fraser, Wilson & Fraser
ATTORNEYS

3,424,371
SYNTHESIS GAS PLANT
Ulrich Happe, 3 Schulzstr., 46 Dortmund, Germany
Filed Apr. 20, 1967, Ser. No. 632,413
U.S. Cl. 230—43     2 Claims
Int. Cl. F04b *39/00*

ABSTRACT OF THE DISCLOSURE

The prevention of intermingling of gases in a synthesis gas plant where fresh or carburated gas is compressed in one chamber and recycle gas is compressed in an adjoining chamber by providing an intermediate chamber maintained at lower pressure than the other chambers and from which gas is continuously drawn off. A liquid is introduced into the intermediate chamber for dissolving reaction products from constituents of the carburated and recycle gas.

BACKGROUND OF THE INVENTION

In synthesis plants of big capacity, such as for example ammonia synthesis plants, it is practical to employ centrifugal compressors of the compression of the fresh or carburated gas. Most ammonia synthesis processes work in a closed cycle process in which the gas is circulated within the synthesis plant by a compressor. The centrifugal compressor for the recycle gas can be combined advantageously with the centrifugal compressor for the synthesis gas. The carburated gas compressor is usually composed of a number of housings, with each housing containing a number of stages. In the last housing it is therefore necessary to handle two gas streams of different compositions. In order to isolate the streams it is necessary to provide a separating wall within the housing. The common compressor shaft is carried through the separating wall and sealed by a labyrinth seal, but since labyrinth seals can never be kept absolutely tight, there always flows a more or less copious stream of gas from the chamber of higher pressure to the chamber of lower pressure. A mixing of the two streams of gas cannot be avoided entirely. However, such mixing is undesirable because it presents certain dangers. As required by the operating conditions of the ammonia synthesis, the recycle gas contains a certain percentage of ammonia, while the carburated gas normally contains traces of $CO_2$ as this can be removed to a great extent but not completely in the refining stages for the synthesis gas. Further it must be taken into consideration that in case of trouble within the gas refining equipment, even higher percentages of $CO_2$ are contained temporarily in the carburated gas. Besides $CO_2$ it also contains usually a small quantity of steam. In mixing carburated or fresh gas and recycle gas it is therefore always possible that small quantities of ammonium salts, such as ammonium carbonate or ammonium carbamate are formed and deposited in solid form on the surface of the inner parts of the compressor. This deposit can cause not only plugging up or other operational troubles but can also lead to dynamical unbalance of the rotor.

It has already been suggested to build into the separating walls of the blower in place of the single labyrinth seal, an arrangement of two labyrinth seals forming an intermediate chamber and to introduce a flushing gas into this intermediate chamber. The flushing gas will then flow in opposite direction through the two labyrinth seals and enter the carburated gas stream as well as the recycle stream. In the course of practical operation however, the execution of this proposal encounters difficulties, because a neutral gas which neither reacts with the carburated gas and its contaminants, nor with the recycle gas, is normally unavailable in an ammonia synthesis plant, and in any case has to be raised to the required pressure.

SUMMARY

It has been found that the danger concurrent with the salt deposit on the blower can be avoided with absolute certainty if a controlled gas stream is bled continuously from the intermediate chamber between the two labyrinth seals and is drained from the compressor housing by means of a separate nozzle. This gas quantity, as disclosed in this invention, is controlled in such manner that the pressure in the intermediate chamber is lower than in the chamber on either side of the separating wall. In such an arrangement both carburated gas as well as recycle gas flows continuously through both labyrinth seals into the intermediate chamber. The gas streams are naturally small. The formation of solid deposits in the intermediate chamber is prevented by injecting a suitable liquid, such as water or a watery solution of ammonia, into the intermediate chamber, if necessary. The composition and quantity of the liquid is chosen in such manner that the formed ammonium salts can be kept in solution in the liquid. It is convenient to direct the gas outlet vertically downward so that the injected liquid can leave the compressor housing together with the gas to be removed. Gas and liquid then separate in a separator arranged below the blower. The gas is removed continuously through a pressure regulator in such manner that the desired pressure ratios exist in the intermediate chamber, while the liquid can be drained manually or through a further regulator.

BRIEF DESCRIPTION OF THE DRAWINGS

The drawing diagrammatically illustrates an apparatus in accordance with the invention.

DESCRIPTION OF THE PREFERRED EMBODIMENT

In a housing 1 is disposed a rotating blower shaft 2 on which are mounted a number of impeller wheels 3 for-compressing the synthesis gas and at the other end of the housing and also mounted on the shaft is an impeller wheel 4 for compressing the recycle gas. Between the group of impellers 3 and the impeller 4 is a transverse separating wall 5 which is interrupted by a housing 8 through which the shaft 2 extends, the housing providing an intermediate chamber 9. Where the shaft 2 extends through the walls of the housing 8 and labyrinth seals 6 and 7 respectively thereby to seal the inside of the chamber 9 from the areas on opposite sides. The synthesis gas enters by way of a nozzle 10 and leaves the compressor at synthesis pressure through a nozzle 11. The recycle gas enters through a nozzle 12 and leaves the compressor through a nozzle 13. The construction however can also be of such design that the recycle gas enters through the nozzle 13 and leaves through the nozzle 12.

Gas is continuously drawn off through a nozzle 14 and is separated in a separator 15 from liquid possibly carried over and flows through a pipe 16 to a pressure regulator 17. The liquid introduced through a nozzle 18 into the intermediate chamber 9 is discharged together with the gas through the nozzle 14. From the separator 15 the liquid is discharged by way of a valve 19.

The process as disclosed in the invention, can be carried out especially advantageously by choosing the arrangement in such manner that the pressure of the recycle gas, which has to be contained by labyrinth seal 7, is somewhat higher than the pressure of the carburated gas which has to be contained by labyrinth seal 6. Then it becomes possible to adjust the pressure in the intermediate chamber 9 to such a level that it is only slightly lower than the pressure to the left of the labyrinth seal 6. The consequence of this is that only a very small quantity of carburated gas will flow through the labyrinth seal 6 and will get lost. However the gas quantity streaming through the labyrinth seal 7 and having the composition of the recycle gas is somewhat greater. This however is harmless, because normally gas has to be treated continuously in the cycle in order to limit the enrichment by inert gases, such as methane and argon. The gas volume which has to be drawn off from the intermediate chamber 9 then represents a part of gas quantity which has to be removed in any event. This invention is not limited to ammonia synthesis plants but can be used advantageously for other gases.

What I claim is:

1. In a gas synthesis plant, having a chamber for compressing carburated or fresh gas and an adjacent chamber for compressing recycle gas by a single operating shaft extending therethrough and carrying compressor impellers in the respective chambers, the method of preventing intermingling of gases from said chambers which consists in providing an intermediate chamber through which the operating shaft extends and sealed from the adjacent chambers except along such shaft, to provide lubyrinth seals between opposite sides of the intermediate chamber and the operating shaft for reducing the gas flow to the intermediate chamber, maintaining the pressure in said intermediate chamber lower than that of either of the other chambers to permit gas therefrom to seep along such shaft into the intermediate chamber, and continuously drawing off gas from the intermediate chamber.

2. The method as claimed in claim 1, consisting in injecting a liquid into the intermediate chamber for dissolving reaction products from constituents of the carburated gas and recycle gas.

References Cited

UNITED STATES PATENTS

| | | | |
|---|---|---|---|
| 2,759,797 | 8/1956 | McKinns | 55—79 |
| 3,350,170 | 10/1967 | Finneran et al. | 23—199 |

REUBEN FRIEDMAN, *Primary Examiner.*

C. N. HART, *Assistant Examiner.*

U.S. CL. X.R.

55—70, 84; 23—199